US009830144B2

(12) United States Patent
Connelly et al.

(10) Patent No.: US 9,830,144 B2
(45) Date of Patent: Nov. 28, 2017

(54) HOME GATEWAY EXPANSION

(71) Applicant: Comcast Cable Communications, LLC, Philadelphia, PA (US)

(72) Inventors: Michael Connelly, Philadelphia, PA (US); Michael Cook, Flemington, NJ (US); James Poder, Cheltenham, PA (US); Daniel Herscovici, Princeton, NJ (US); Hari Venkatram Pedaprolu, King of Prussia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 120 days.

(21) Appl. No.: 14/610,406

(22) Filed: Jan. 30, 2015

(65) Prior Publication Data

US 2015/0205599 A1 Jul. 23, 2015

Related U.S. Application Data

(63) Continuation of application No. 13/449,901, filed on Apr. 18, 2012, now Pat. No. 8,995,450, which is a continuation of application No. 12/723,775, filed on Mar. 15, 2010, now Pat. No. 8,175,104.

(51) Int. Cl.
*G06F 9/445* (2006.01)
*H04L 12/28* (2006.01)
*H04L 12/66* (2006.01)
*H04L 12/24* (2006.01)
*H04L 12/26* (2006.01)

(52) U.S. Cl.
CPC ............ *G06F 8/65* (2013.01); *H04L 12/2836* (2013.01); *H04L 12/66* (2013.01); *H04L 41/0213* (2013.01); *H04L 41/082* (2013.01); *H04L 43/0817* (2013.01)

(58) Field of Classification Search
CPC ....... G06F 8/65; H04L 12/2836; H04L 12/66; H04L 41/0213; H04L 41/082; H04L 43/0817

See application file for complete search history.

(56) References Cited

U.S. PATENT DOCUMENTS

| 6,918,000 | B2 | 7/2005 | Zolnowsky | |
|---|---|---|---|---|
| 7,522,904 | B1 * | 4/2009 | Zhu | H04L 12/2898 370/338 |
| 2002/0147762 | A1 | 10/2002 | Tree | |
| 2003/0217125 | A1 | 11/2003 | Brancati et al. | |
| 2004/0228336 | A1 | 11/2004 | Kung et al. | |
| 2006/0164891 | A1 | 7/2006 | Mills et al. | |
| 2006/0187954 | A1 * | 8/2006 | Braschi | H04M 7/0069 370/463 |
| 2006/0277275 | A1 | 12/2006 | Glaenzer | |
| 2006/0282861 | A1 | 12/2006 | Chen et al. | |
| 2008/0246850 | A1 | 10/2008 | Marlowe | |
| 2008/0256283 | A1 | 10/2008 | Chiu et al. | |

(Continued)

*Primary Examiner* — Duc C Ho
(74) *Attorney, Agent, or Firm* — Banner & Witcoff, Ltd.

(57) ABSTRACT

As described herein, a gateway device may include one or more expansion ports to add functionality. The added functionality can be of any desired type, such as adding telephone call routing capabilities, or high-definition radio capabilities. The added functionality can include new wireless communication abilities, such as adding Bluetooth capability, and the combination may allow greater networked communication.

15 Claims, 8 Drawing Sheets

(56) References Cited

U.S. PATENT DOCUMENTS

| | | |
|---|---|---|
| 2009/0070692 A1 | 3/2009 | Dawes et al. |
| 2009/0204805 A1* | 8/2009 | Robba ................. H04L 63/0485 |
| | | 713/153 |
| 2009/0299572 A1 | 12/2009 | Fujikawa et al. |
| 2010/0022277 A1 | 1/2010 | An et al. |
| 2010/0071053 A1 | 3/2010 | Ansari et al. |
| 2010/0093382 A1* | 4/2010 | Samaha .................. H04W 4/12 |
| | | 455/466 |
| 2010/0158225 A1* | 6/2010 | Rogers .............. H04M 3/42042 |
| | | 379/142.06 |
| 2011/0161285 A1 | 6/2011 | Boldyrev et al. |
| 2012/0042022 A1* | 2/2012 | Sheth .................... H04L 12/588 |
| | | 709/206 |
| 2012/0190386 A1 | 7/2012 | Anderson |

* cited by examiner

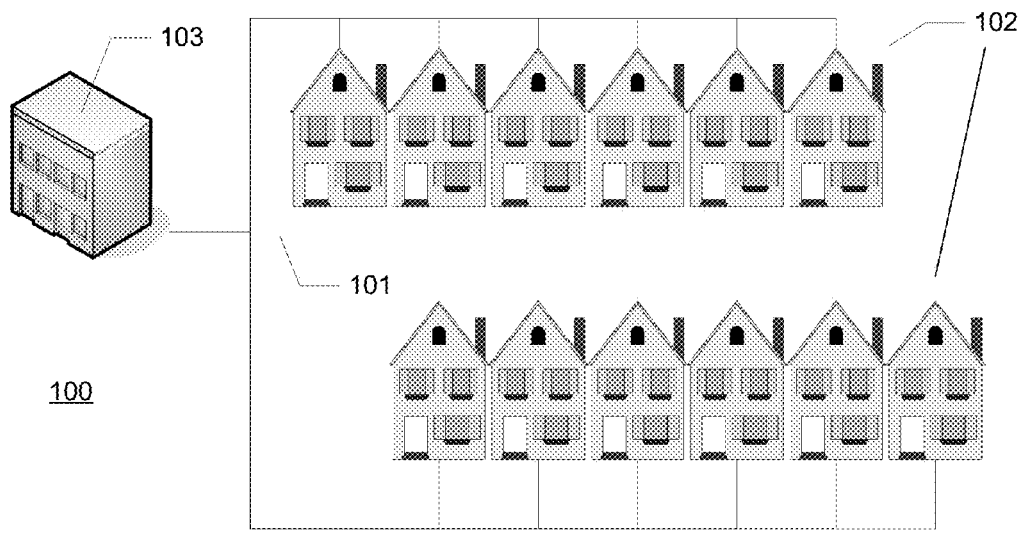
FIG. 1
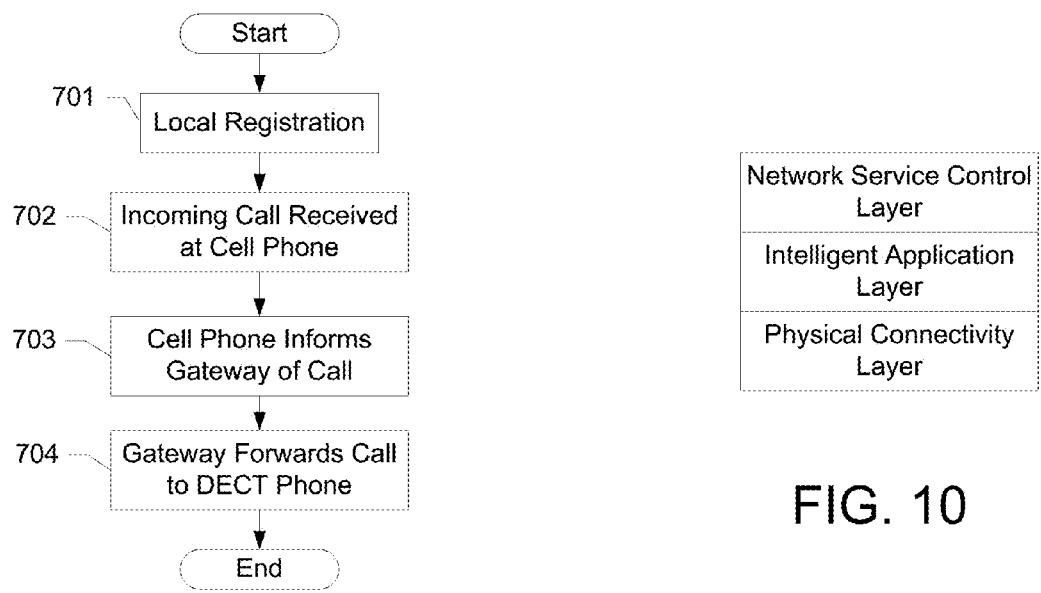
FIG. 7
| Network Service Control Layer |
| Intelligent Application Layer |
| Physical Connectivity Layer |
FIG. 10

HOME GATEWAY EXPANSION

CROSS-REFERENCE TO RELATED APPLICATIONS

The present application is a continuation of U.S. patent application Ser. No. 13/449,901, now U.S. Pat. No. 8,995,450, filed Apr. 18, 2012, and entitled "HOME GATEWAY EXPANSION", which was a continuation of U.S. Pat. No. 8,175,104, filed Mar. 15, 2010, and entitled "HOME GATEWAY EXPANSION," both of which are hereby incorporated by reference as an example embodiment.

FIELD OF ART

The features described herein generally relate to communications between devices on a distributed network. For example, some features relate to distributing signals through a television distribution network, and in managing communications over the network.

BACKGROUND

Today, modems, such as cable modems, offer Internet connectivity to subscribers' homes. These modems are typically connected to an information distribution network, such as a coaxial cable network, an optical fiber network, a hybrid fiber/coaxial cable network, or a wireless network, and communicate with a network device outside the home (e.g., a termination system, such as a cable modem termination server, or CMTS). Within the home, the modem may be connected to an in-home network, such as an Ethernet network, an in-home coaxial cable network (e.g., per the Multimedia Over Coax Alliance—MoCA—specification), wireless network, etc., and various devices within the home may use that network to ultimately communicate with network devices outside the home.

The modems, however, are not easily modifiable or upgradeable. Firmware updates may be downloaded from the external network to update the firmware within the modem, but such an update is limited to the firmware/software of the modem. Hardware upgrades are done by replacing the entire modem with a new model, or not at all.

There remains an ever-present need to offer greater functionality and customization to users, with minimal inconvenience.

SUMMARY

This summary is not intended to identify critical or essential features of the inventions claimed herein, but instead merely summarizes certain features and variations thereof.

In some embodiments herein, a home gateway device may be used to coordinate communication within a premise, such as a home. The gateway may include an external interface connected to an external network (e.g., a cable modem connected to a hybrid fiber/coaxial cable network), and one or more internal interfaces connected to one or more internal networks within the premise (e.g., a Multimedia Over Coax Alliance—MoCA—server connected to an in-home coaxial cable network). The gateway may coordinate communications between devices in the home and devices on the external network.

In some embodiments, the gateway may include expansion ports configured to accept one or more plug-in expansion modules. The expansion modules may add a wide variety of new features and services. For example, the modules may add communication capabilities to the gateway, such as support for different communication media and/or formats. With this added support, the gateway can then communicate with other devices in the home, and can facilitate sharing of the capabilities of those devices.

One example of these capabilities can involve supporting a Bluetooth-enabled cellular or mobile telephone. The gateway can use a Bluetooth expansion module to communicate with the mobile phone, and a wide range of call routing and processing capabilities are enabled. For example, non-cellular telephone devices may use the cell phone, via the gateway, to make cell phone calls. Similarly, incoming cell phone calls can be rerouted from the cell phone to another device in the home. A cell phone call may also be handed off to a non-cell phone carrier after initialization.

Another example of this is can be used to tune to wireless channels. For example, an ATSC (Advanced Television Systems Committee) television module or HD radio module may allow the gateway to receive content broadcasted over ATSC or HD radio channels, and the gateway can redistribute that content locally to other devices that lack their own tuner. Similarly, the gateway can obtain content (e.g., via the Internet) that might not be native to ATSC or HD radio, and can use the wireless module to convert and transmit that content for reception by other ATSC or HD radio devices in the home.

Physically, the gateway may be configured to help minimize risk of damage. The expansion ports may be recessed in a bay, with a protective cover. The modules may be stackable, such that each expansion module has its own expansion port, allowing multiple expansion modules to share a single expansion port on the gateway. The gateway may include a camber lock/eject mechanism to help hold the expansion module(s) in place. The modules may also be color-coded to help simplify prioritization (e.g., to help users ensure that modules requiring battery backup are inserted into expansion ports that have battery backup).

Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

FIG. 1 illustrates an example network.

FIG. 7 illustrates an example process of call handling.

FIG. 10 illustrates an example protocol layer stack, showing different conceptual layers of connectivity.

DETAILED DESCRIPTION

Figure 2:
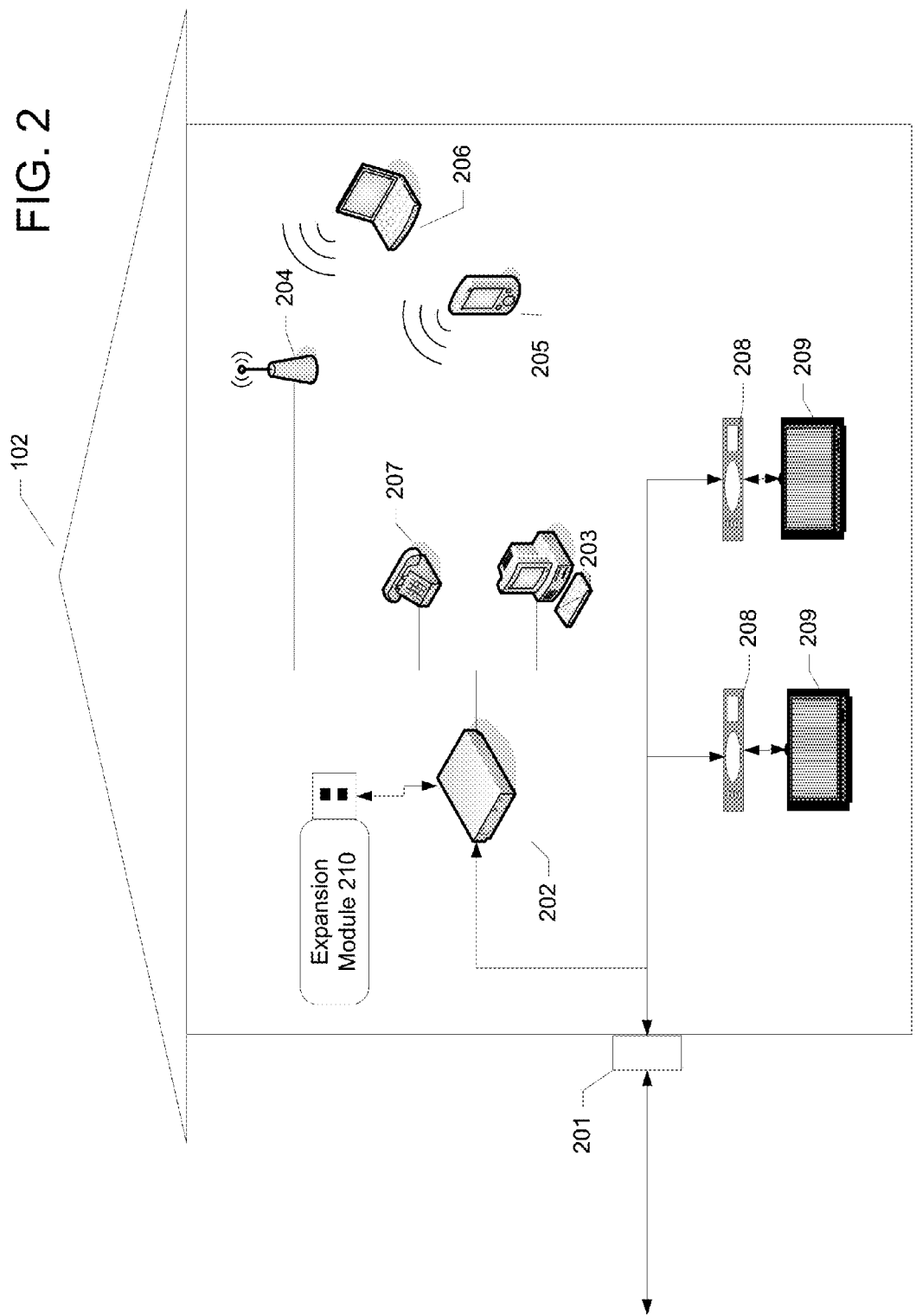
FIG. 2 illustrates an example home with a home gateway and various communication devices.

FIG. 1 illustrates an example information distribution network 100 on which many of the various features described herein may be implemented. Network 100 may be any type of information distribution network, such as satellite, telephone, cellular, wireless network, etc. The example illustrated may be a hybrid fiber/coax distribution network found in many cable television networks. Such networks 100 use a series of interconnected transmission lines 101, such as coaxial cables, to connect multiple homes 102 to a central office or headend 103. The headend 103 may transmit downstream information signals onto the lines 101, and each home 102 may have a tuner used to receive and process those signals.

The lines 101 may be a series of interconnected coaxial cables, fiber optic cables, or any other desired transmission medium. There may be one cable originating from the headend 103, and it may be split a number of times to distribute the signal to various homes 102 in the vicinity (which may be many miles) of the headend 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, with other portions implemented as coaxial cable, resulting in a hybrid fiber/cable network of lines 101. By running fiber optic cable along those portions, signal degradation in those portions may be significantly minimized, allowing a single headend 103 to reach even farther with its network of lines 101 than before.

The headend 103 may include a server configured to handle communications with the homes 102 using whichever communication medium is available. For example, in a coaxial cable or hybrid fiber/coax system, the headend 103 may include a modem termination system (MTS), such as a cable modem termination system (CMTS), which may be a computing device configured to manage communications between devices on the network of lines 101 and backend devices such as content sources (e.g., video on demand servers, television program sources, etc.), headend computers and other networks. The CMTS may be as specified in the Data Over Cable Service Interface Specification (DOCSIS) standard, published by Cable Television Laboratories, Inc. (a.k.a. CableLabs), or it may be a similar or modified device instead. The CMTS may be configured to place data on one or more downstream frequencies to be received by modems at the various homes 102, and to receive upstream communications from those modems on one or more upstream frequencies, as well as to serve as an interface to devices and networks that are further upstream, such as other Internet devices. Similar types of headend systems may be used for other types of networks, such as an optical fiber termination system for optical media, telephone line DSLAM (Digital Subscriber Line Access Multiplexer) for telephone lines, satellite transceiver, cellular telephone station, local area wireless (e.g., WiMax), etc.

Figure 3:
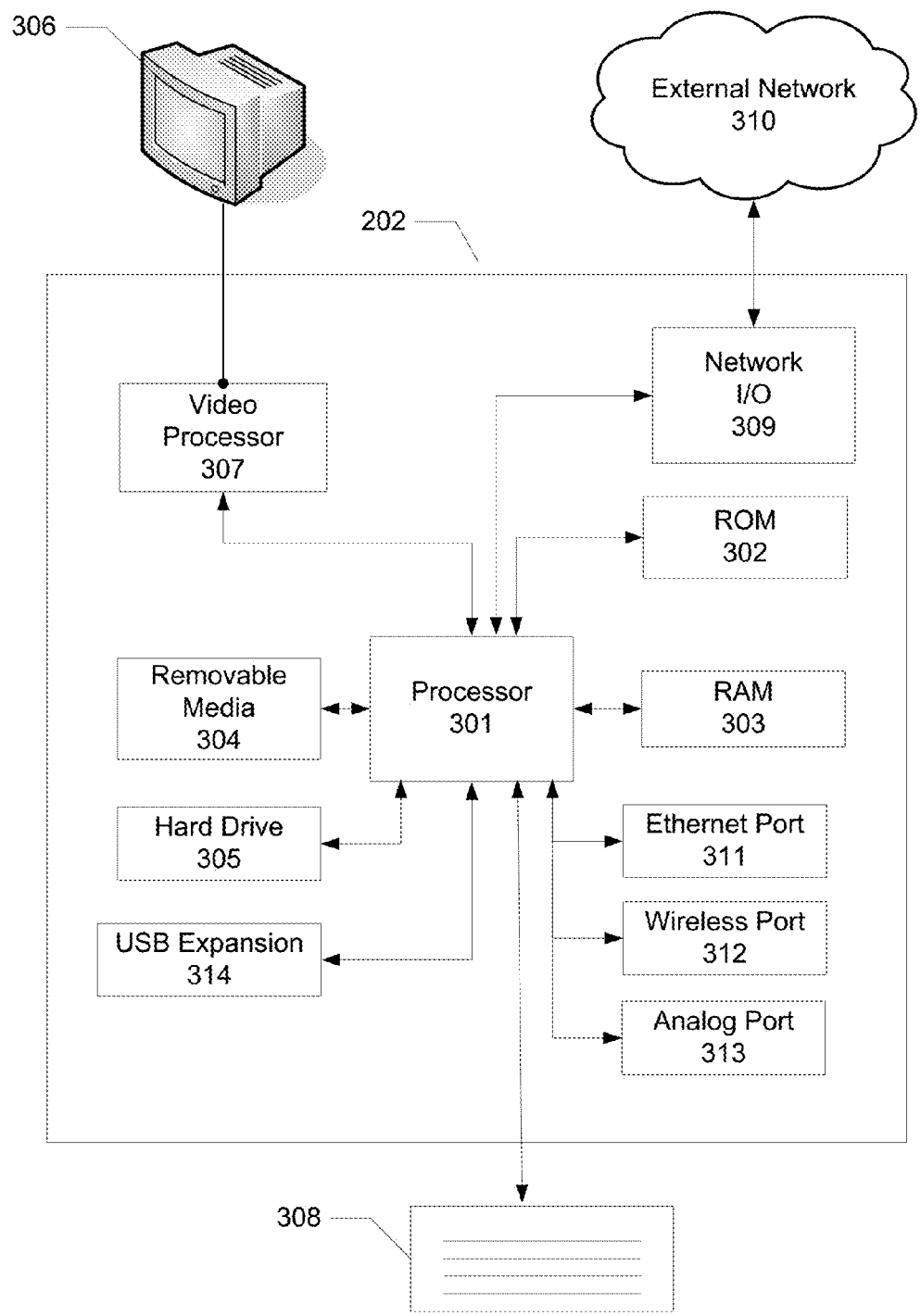
FIG. 3 illustrates an example computing device on which various features described herein may be implemented.

FIG. 2 illustrates a closer view of a home 102 that may be connected to the network 100 via an interface 201. The transmission line (coaxial, fiber, etc.) may be connected to a home gateway device 202. The gateway device 202 may be a computing device configured to communicate over the network 101 and with the headend 103. The gateway 202 may include, for example, a modem configured to communicate with the termination system at the headend 103. Additional details of an example gateway 202 are shown in FIG. 3, discussed further below.

The gateway 202 may be connected to a variety of devices within the home, and may coordinate communications among those devices, and between the devices and networks outside the home 102. For example, the gateway 202 may include a modem (e.g., a DOCSIS device communicating with CMTS), and may offer Internet connectivity to one or more computers 203 within the home. The connectivity may also be extended to one or more wireless routers 204. For example, router 204 may be an IEEE 802.11 router, local cordless telephone (e.g., Digital Enhanced Cordless Telephone—DECT), or any other desired type of wireless network. Various wireless devices within the home, such as a DECT phone 205 (or a DECT interface within a cordless telephone) and portable laptop computer 206, may communicate with the gateway 202 using wireless router 204.

The gateway 202 may also include one or more telephone interfaces, to allow the gateway 202 to communicate with one or more telephones 207. Telephones 207 may be a traditional analog twisted pair telephone (in which case the gateway 202 may include a twisted pair interface), or it may be a digital telephone such as a Voice Over Internet Protocol (VoIP) telephone, in which case the phone 207 may simply communicate with the gateway 202 using a digital interface, such as an Ethernet interface.

The gateway 202 may communicate with the various devices within the home using any desired connection and protocol. For example, an in-home MoCA (Multimedia Over Coax Alliance) network may use a home's internal coaxial cable network to distribute signals to the various devices in the homes. Alternatively, some or all of the connections may be of a variety of formats (e.g., MoCA, Ethernet, HDMI, DVI, twisted pair, etc.), depending on the particular end device being used. The connections may also be implemented wirelessly, using local wi-fi, WiMax, Bluetooth, or any other desired wireless format.

The incoming line may also be connected to one or more network interface devices 208, which can be set-top boxes (STBs), digital video recorders (DVRs), etc. The STBs 208 may receive and decode content via the line (e.g., optical, coaxial, etc.), and may provide that content to users for consumption, such as for viewing video content on a television 209. Alternatively, televisions, or other viewing devices 209, may be connected to transmission line 201 directly without a STB, and may perform the functions of a STB. Any type of content, such as video, video on demand, audio, Internet data etc., can be accessed in this manner. As an alternative, the STB functionality can be incorporated with the gateway, so that the gateway 202 receives and decodes content from the line, and supplies it to the televisions for display using any desired local home physical interface.

FIG. 2 also illustrates an expansion module 210, which may be inserted into the gateway 202 to expand the functionality of the gateway, as described herein. The module 210 itself may be relatively small, such as the size of a USB thumb drive. The module may have a male and a female USB connection on opposite ends, allowing multiple expansion modules to be stacked on top of one another. The gateway may be enclosed in a casing (e.g., a computer chassis, or other housing), and may include a plurality of recessed USB ports to accept the expansion modules. The recess may be sized to allow the expansion module to remain flush with (or sunken in from) the outer perimeter of the gateway's enclosure. The recess may also be sized at a width, e.g., 40 mm, that is double the standard width of the USB connector, to allow room for a user's fingers in removing the module, and may include a closeable cover with a camber lock to hold the cover in place.

The ports may also be color-coded, or otherwise marked, to identify ports having different capabilities. For example, some ports may have battery backup or an alternative power supply, and those ports may be identified with a different color from other ports, and the expansion modules may be similarly color coded to simplify use. Battery backed modules may be useful for certain critical functions, such as telephone service, home security, fire alarm, etc., that may be needed in the event of a power outage at the house.

FIG. 3 illustrates a computing device that may be used to implement the gateway 202, although similar components (e.g., processor, memory, computer-readable media, etc.) may be used to implement any of the devices described herein. The gateway 202 may include one or more processors 301, which may execute instructions of a computer program to perform any of the features described herein. Those instructions may be stored in any type of computer-readable medium or memory, to configure the operation of the processor 301. For example, instructions may be stored in a read-only memory (ROM) 302, random access memory (RAM) 303, removable media 304, such as a Universal Serial Bus (USB) drive, compact disk (CD) or digital versatile disk (DVD), floppy disk drive, or any other desired electronic storage medium. Instructions may also be stored in an attached (or internal) hard drive 305. The gateway 202 may include one or more output devices, such as a display 306 (or an external television connected to a set-top box), and may include one or more output device controllers 307, such as a video processor. There may also be one or more user input devices 308, such as a remote control, keyboard, mouse, touch screen, microphone, etc. The gateway 202 may also include one or more network input/output circuits 309, such as a network card to communicate with an external network 310. The network interface may be a wired interface, wireless interface, or a combination of the two. In some embodiments, the interface 309 may include a modem (e.g., a cable modem), and network 310 may include a television distribution system, such as a coaxial, fiber, or hybrid fiber/coaxial distribution system (e.g., a DOCSIS network).

The gateway 202 may include a variety of communication ports or interfaces to communicate with the various home devices. The ports may include, for example, Ethernet ports 311, wireless interfaces 312, analog ports 313, and any other port used to communicate with devices in the home. The gateway 202 may also include one or more expansion ports 314. The expansion ports 314 may allow the user to insert an expansion module to expand the capabilities of the gateway 202. As an example, the expansion port may be a Universal Serial Bus (USB) port, and can accept various USB expansion devices. The expansion devices may include memory, general purpose and dedicated processors, radios, software and/or I/O modules that add processing capabilities to the gateway 202. The expansions can add any desired type of functionality, several of which are discussed further below.

Figure 4:
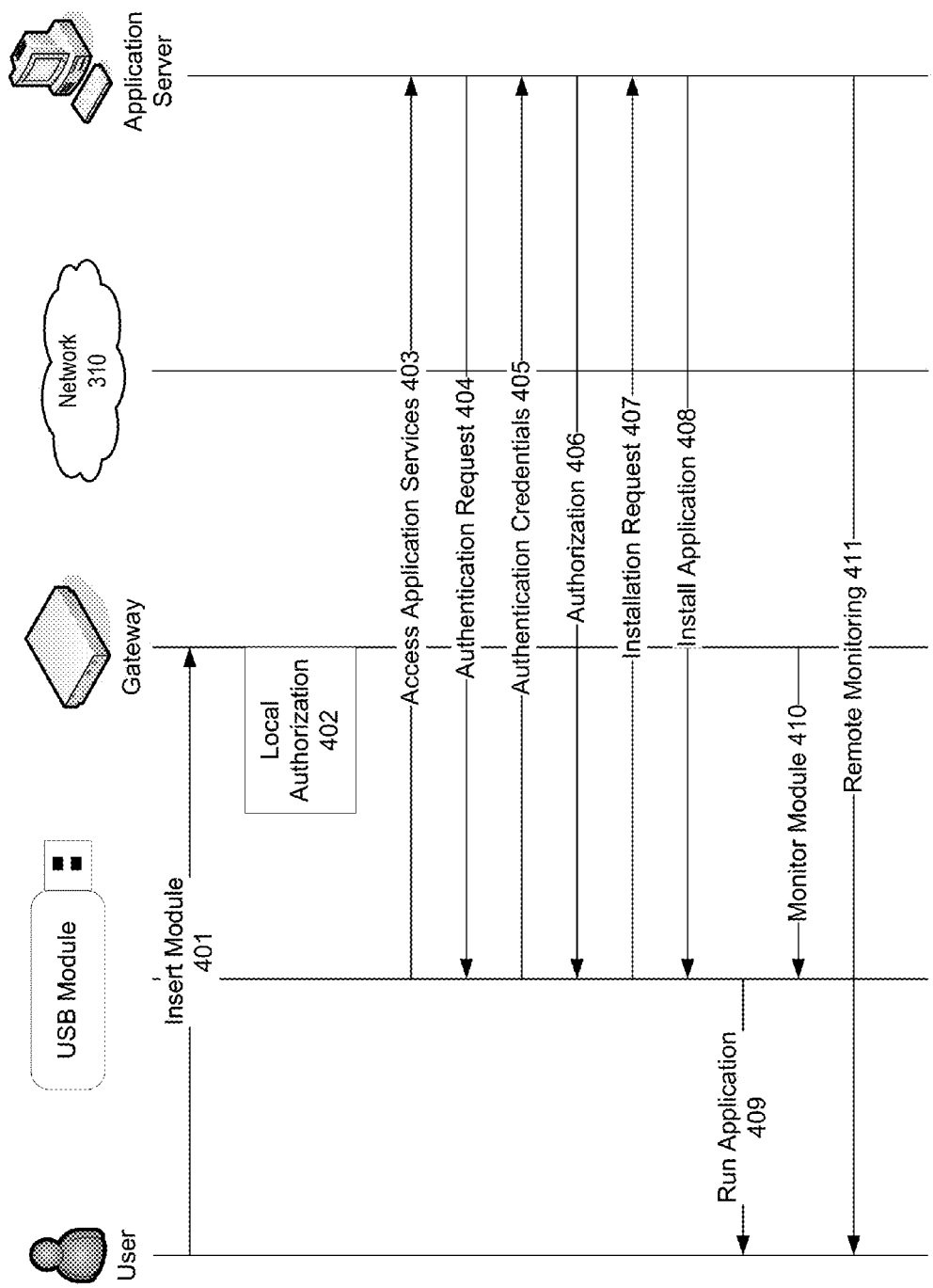
FIG. 4 illustrates an example signaling flow for an authentication process.

FIG. 4 illustrates an example authentication process flow that can occur when an expansion module is inserted into the gateway. The module may be inserted into a recessed opening in the gateway, which may include a cover or lid to enclose the expansion ports. After the module is inserted 401, the gateway 202 may perform local authorization 402 to determine if the newly-inserted extension module is able to work with the gateway 202, and may copy a basic installation program from the module (for installing an application or service offered by the module). This authorization may include an initial exchange of information identifying the module (e.g., a unique hardware address, such as a MAC—Media Access Control—address) and/or the user (e.g., a user identification value stored in the module, a phone number, Personal Identification Number—PIN, etc.). This exchange of information may automatically occur as a result of insertion (e.g., the extension module circuitry may be configured to automatically transmit this information upon initial insertion/power up). Alternatively, some or all of this information may be requested by the gateway 202, for example, through an onscreen display or an administrative user interface (e.g., an administrative Internet browser page).

The authorization process may also include transmission of security credentials, such as exchanging signed digital certificates for verification using predetermined public keys. The gateway 202 may authenticate a signed certificate from the extension module to confirm its identity.

If the authorization is successful, the extension module may request (or generate) a message 403 to one or more application servers that service the extension features of the module. The message 403 may identify the module, the gateway 202, and one or more software applications desired by the module (or the versions of existing software stored on the module). The software may be any desired type of software, such as a home security application, Bluetooth service application, etc. The software may also be firmware for basic operation of the module.

In response, the server may transmit an authentication request or challenge 404, seeking to confirm the extension module's authentication for the service. This may involve another transmission 405 of various authentication credentials, such as signed certificates, challenge responses, etc. from the module. The server may also consult a stored database identifying services to which the particular gateway is entitled to receive, and may determine whether the addition of the expansion module is supported by that service level, to decide whether the expansion module should be authorized.

If the application server authorization is successful, the application server may transmit an authorization message 406 to the module. The application server may also store information identifying the fact that the module and/or the user has been inserted into the gateway 202, and may identify the particular software (if any) requested. The module may then transmit a request 407 for the one or more desired applications (to the extent the request was not already included in the initial message 403). When sending the request 407, the module may transfer software that is about to be updated/replaced into a separate memory location, to serve as a failsafe backup in case the ensuing update is interrupted. Alternatively, new software code can be temporarily stored in a buffer portion of memory, and transferred to the main memory (replacing the old version) only after determining that the update download was successful.

In response, the server may download 408 the application program to the module. The downloaded code may be encrypted for protection. The module may then begin execution of the new (or updated) application program 409, providing whatever services to the user the module is intended to provide.

When the new application is running, its operation (and the operation of the module) may be monitored 410 by the gateway 202 for error conditions. The application and module may also be monitored remotely 411 by the application server. This monitoring may be performed in any desired manner, such as through use of code downloaded with the installation 408, an Internet admin page on the gateway or over the Internet, via SNMP (Simple Network Message Protocol), HNAP (Home Network Administration Protocol), TR069 (or CPE WAN Management Protocol—CWMP), etc. Some of the monitoring may include the gateway 202 recording performance characteristics of the module (e.g., how often it ran, how quickly it ran, etc.), the module's power consumption, time of usage, bandwidth used and/or needed, etc.

The addition of the module and new application can provide a wide variety of new features and functionalities to the home gateway 202. For example, the expansion module may include a digital television receiver (e.g., circuitry configured to tune and receive ATSC—Advanced Television Systems Committee—signals), or an HD radio receiver. The addition of such an expansion module may allow the gateway 202 to tune to and receive that content, which the gateway may then process and distribute to other devices in the home—even devices that lack their own digital television or HD radio tuner.

Figure 5:
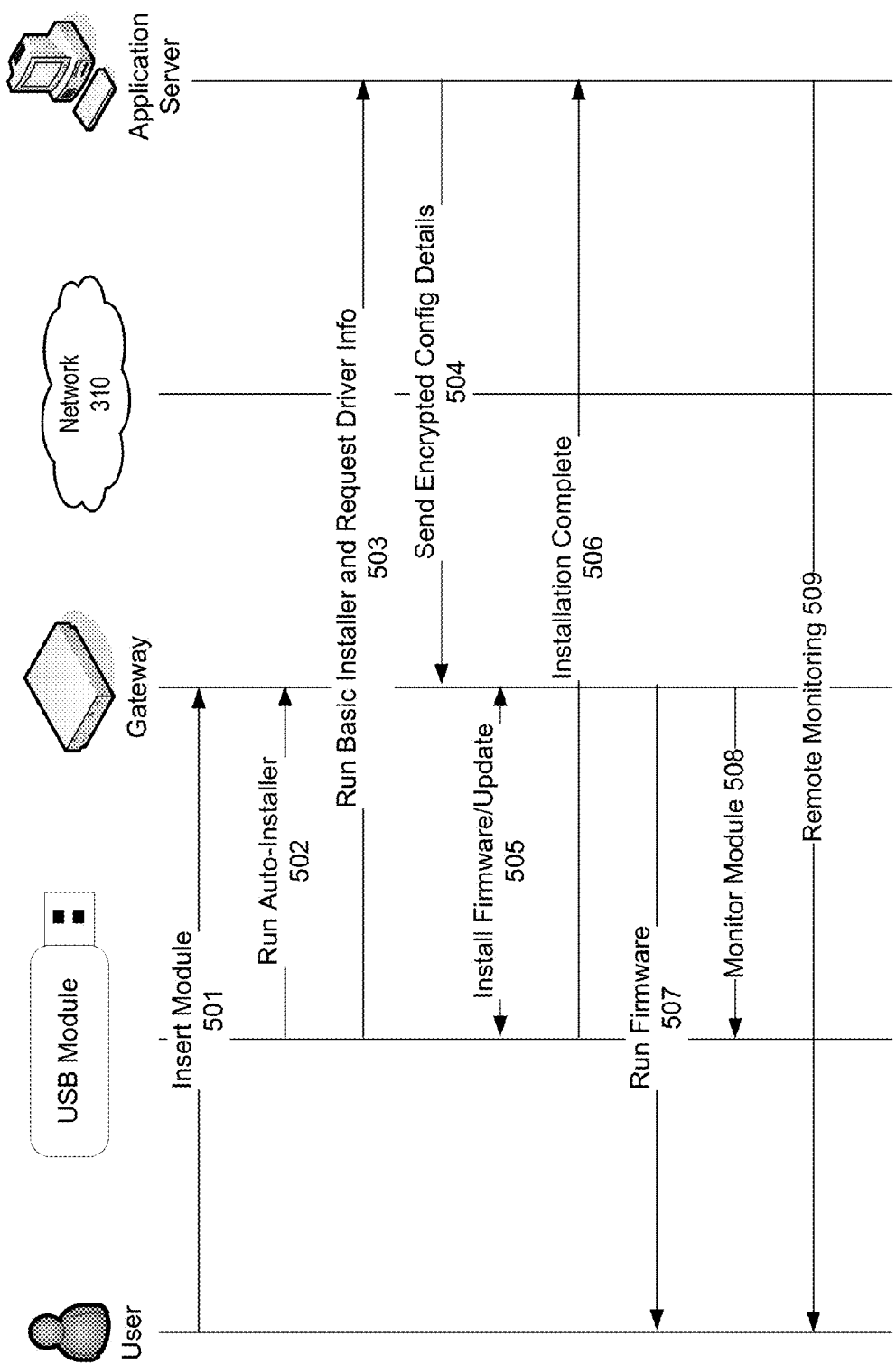
FIG. 5 illustrates an example signaling flow for a firmware installation process.

Expansion modules may also have their firmware updated through downloads, much in the same way software applications are loaded, and can even do so at the application layer, rather than having to write a driver at a firmware layer. Updating the expansion module firmware can allow systems to avoid having to update the gateway firmware itself, simplifying the process of keeping up-to-date. FIG. 5 illustrates an example signaling flow for such a firmware upgrade. In step 501, the user may insert an expansion module containing code for an application that may require a firmware upgrade. In step 502, the gateway may autodiscover the module, and the module can run an auto installer program based on the host/device configuration of the module. The auto installer may be a smaller piece of code that can confirm firmware version and hardware capabilities of the gateway and/or module.

In step 503, the module may then run a firmware installer program to communicate with the application server, and request the updates for firmware needed by the module. The request may identify the module, the existing version of the firmware in the module (or on the gateway), and the gateway's hardware configuration and/or capabilities. The server may then respond 504 by transmitting, encrypted if desired, the firmware upgrade, application data, configuration data and any other desired data. This approach allows the application server to maintain an authorized service domain. The server may maintain a record of the devices that are authorized to receive service, and can remotely initiate and monitor firmware upgrades within the domain. The expansion module may be added to an authorized service domain of its corresponding gateway, and can be provisioned to receive authorized content form the server. In this manner, the gateway (via its processor) and/or expansion module may be managed by an external server (e.g., the content server, application server from FIG. 5, etc.). In some embodiments, the external server can lock down the functionality of the gateway, such that the gateway may always need approval of the server before adding functionality, and that the external server may have management control over all local devices communicating with the gateway 202. In this manner, the control over the gateway may be cloud-based. Through such external management, the external managing server may transmit commands to the gateway's processor, causing the processor to perform the various functions described herein, and to manage local devices (e.g., expansion modules, phones, radios, etc.) to permit or deny the features described herein.

In step 505, the expansion module may install the firmware update to itself, storing updated firmware received via the gateway. In doing so, the gateway may also copy a fail safe image of the module's firmware (or vice versa), for use in case the module's version gets corrupted in the update process. In step 506, the expansion module may inform the server that the update was a success, and in step 507 the gateway and module can then run the new firmware to provide whatever functionality is offered by the module. Steps 508 and 509 are monitoring steps, similar to that described in steps 410 and 411 above, by which the gateway and/or application server can monitor the operation of the expansion module.

As noted above, the expansion module can add a wide variety of features to the gateway. One example type of functionality adds network connectivity to the gateway 202. For example, if the gateway 202 does not already include a Bluetooth connection interface, then a Bluetooth USB expansion module may be inserted into the gateway 202 to add that functionality. The Bluetooth USB expansion module may be inserted into one of the gateway 202's USB ports 314, and the gateway 202 may then use it to communicate with Bluetooth network devices in the home.

In the description above, step 503 resulted in a "pull" updating process, in which the expansion module requested an update. The update can alternatively be a "push" process, triggered by the external application server.

Figure 6:
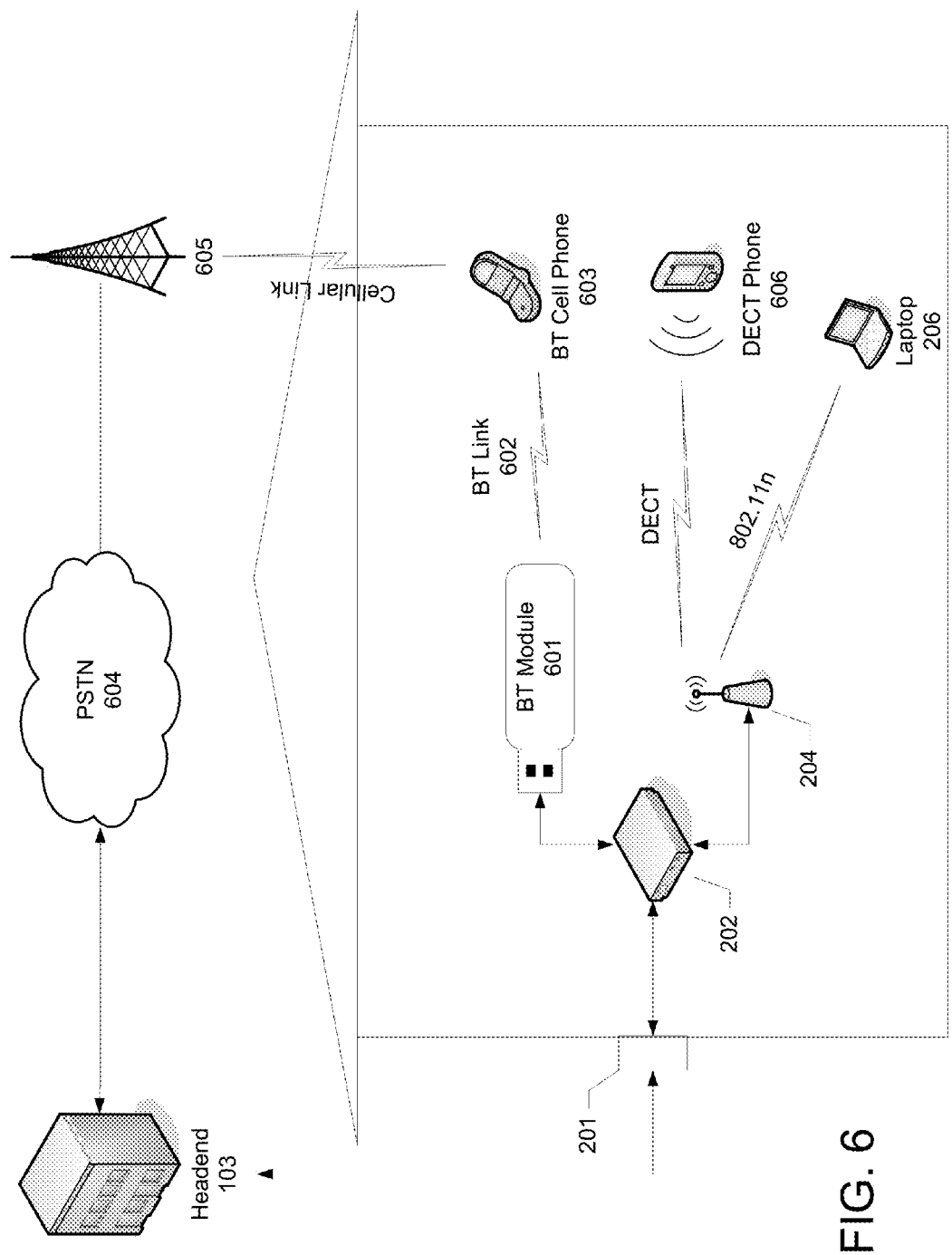
FIG. 6 illustrates an example configuration using a wireless Bluetooth expansion module.

FIG. 6 illustrates an example home, with a Bluetooth expansion module 601 inserted in the gateway 202. The expansion module 601 may include internal antennas and processing circuitry to communicate via Bluetooth wireless link 402 with one or more Bluetooth devices. The expansion module may be used to add Bluetooth support to the gateway 202, allowing the gateway 202 to communicate with devices that may have been previously inaccessible due to communication protocol incompatibility. This connectivity can be used to allow a variety of features, such as adding IP connectivity via Bluetooth to devices, or allowing use of Bluetooth peripherals such as headsets.

One such device may be a Bluetooth enabled cellular telephone 603. The phone 603 may include communication circuitry for communicating with a mobile cellular telephone network 404 and land-line PSTN (Public Switched Telephone Network) 405, and may also include Bluetooth circuitry and components to communicate with gateway 202 over a Bluetooth link 602 and the expansion module 601. The gateway 202 can use the phone 603 to supplement other voice calling capabilities, such as a local cordless digital DECT telephone 606. This example uses a DECT phone 606, but other short-range cordless phone protocols may be used as well. For example, the phone 606 may be a CAT-iq based phone, an IEEE 802.11 Wi-Fi phone, or any other desired type of VoIP phone. The phone 606 need not be a cordless one, so even wired digital phones can be used as well.

FIG. 7 illustrates an example call process using phones 603 and 606. In this example, an incoming phone call may be redirected from the phone 603 to phone 606 using gateway 202. For starters in step 701, the phones 603 and 606 may first conduct a local registration process register themselves with the gateway 202. The local registration may automatically occur upon the device entering the home, and may involve the phones 603/606 informing the gateway 202 of the phones' respective identities (e.g., hardware MAC address, user identification, phone number, account number, etc.), so that the gateway 202 can store information identifying the various phones 603 that are available to the gateway 202. This registration may also inform the gateway 202 (or a voice session management application running on the gateway 202) of the various capabilities and states of the phones as well to assist in call management (e.g., hardware/software features of the phones, firmware version, status of battery, whether it is currently in an active call, whether call forwarding is activated, etc.). Some or all of this registration information may be delivered from the gateway 202, to the headend 103, and ultimately to one or more call routing servers on the PSTN 604 or mobile network 605, so that those servers know where to route incoming calls that are addressed to the phones 603/606 (or their respective users, phone numbers, addresses, etc.).

As part of this registration, a user may provide call handling instructions to the gateway 202. For example, the user may indicate to the gateway 202 that incoming calls received at the cell phone 603 are to be redirected to the DECT phone 606. This may be desirable if, for example, the DECT phone had larger speakers than the cell phone 603. The relay instruction may be provided to the phone 603 for use in future incoming calls.

In step 702, a caller on the external network 604/605 may initiate a call addressed to the cell phone 603. A call routing server on the mobile network 605 may route the call to the nearest cell tower servicing the phone 603, and initiate a connection with the phone 603.

In step 703, the phone 603 may forward call details to the gateway 202 via the module 601. The call details may identify the source of the call, the destination of the call, the user of the phone 603, the phone 603 itself, the type of network originating the call, and any other desired call detail.

In step 704, the gateway 202 may determine that the user of the phone 603 had previously requested that incoming cell phone calls be routed to the DECT phone 606. It may do this, for example, by consulting a call routing table stored in memory, which may identify call handling instructions entered by various users and/or phones in the home.

In step 706, the call may be established with the DECT phone 603. In doing so, the gateway 202 and cell phone 603 may serve as middlemen for a communication session between the DECT phone 606 and the cellular network 604 (and ultimately the original caller). Separate communication links may be established in the home for this call—one between the DECT phone 606 and the gateway 202, and another between the gateway 202 (or its module 601) and the cell phone 603. In this manner, the cell phone 603 may still actively process the call signals for the duration of the call, serving as a Bluetooth-to-cell-phone interface.

As an alternative, the cell phone 603 can hand off the call responsibilities to the gateway 202. To do so, the gateway 202 could, in step 706, establish an independent communication link to the mobile network 605, via headend 103 and/or the PSTN 604, requesting that the call be transferred from the cell phone 603 to the headend 103 (and ultimately to the gateway 202). The gateway 202 can establish a communication session with the corresponding server at the mobile network 605 using the transmission line connection, and the call can be carried out from the mobile network 605 to the headend 103 to the gateway 202 and to the DECT phone 606. In this manner, the cell phone 603 can be used for initial reception of the call, but once the call is transferred to the gateway 202, the cell phone 603 can be turned off and the remainder of the call can be handled using the cable line connection. This kind of call handoff can even be performed before the incoming call is received. For example, in the registration 702, the user may also send a call forwarding instruction to a call router in the mobile network 605, instructing that network 605 to forward incoming calls to a different phone number/address associated with a server at the headend 103. Then, when an incoming call is made, the mobile network 605 can forward the call to the headend 103, which may then establish the call with the gateway 202 and DECT phone 606, thereby avoiding the need for the cell phone 603.

The FIG. 7 example uses an example of routing a call to the DECT phone 606, but the internal call routing can be made to any desired device accessible to the gateway 202. For example, incoming calls can be routed to a voice-enabled personal computer 203, television set-top box 208, etc. To support this functionality, the gateway 202 and/or other end devices may include voice and call handling applications, and may include an EMTA (Embedded Multimedia Terminal Adapter), EDVA (Embedded Digital Voice Adapter), Terminal Adapter for VoIP over broadband, and/or PC soft phone software and/or hardware. Different portions of the call may be routed to different devices as well. For example, an initial caller identification message for an incoming call may routed to the set-top box 208 for display on television 209. The subsequent call, if answered, may be routed to a different voice-enabled device, such as the DECT phone 606.

The FIG. 7 example uses an example of rerouting an incoming cell phone 603 call to a DECT phone 606, but calls can be rerouted the other way around as well. For example, an incoming call directed to the DECT phone 606 may be rerouted to the cell phone 603 instead, using the Bluetooth module 601 to create a voice channel between the gateway 202 and the cell phone 603.

The availability of multiple external network connections (one via the headend 103 and gateway 202, the other via the cell phone 603) allows for backup in the event of failure. For example, if the DECT phone 606 normally uses the gateway 202 and headend 103 for a VoIP phone call, but the server in the headend 103 becomes unavailable, then the outgoing call may be rerouted to the cell phone 603 and the mobile network 605 instead. Similarly, if the cell phone 603 attempts to make a call through the mobile network 605, and encounters a failure in that network 605, then the gateway 202 may initiate the call through the headend 103 instead.

The discussion above focuses on call routing using the various network connections available to the gateway. Other aspects of call handling may benefit as well. For example, caller identification information may initially be included with an incoming phone call message. The gateway 202 could simply display this caller identification information on whatever device is ultimately receiving the call, or on any other desired device in the system (e.g., a caller ID for a call coming in on a mobile phone service may appear on a television, even if the user's phone and television companies are two different companies). Alternatively, the gateway 202 may use a different network connection to retrieve or augment this information. So, for example, if an incoming cell phone call message includes the calling party's telephone number, the gateway 202 may take that information and automatically generate a search through other resources that are not originating and not receiving the call, such as an Internet database accessible through network 310 (e.g., a social networking database, such as a Plaxo database), a home database stored on a laptop 206, the address book of another Bluetooth phone in the home, etc.

The initial notification of an incoming call may also be delivered to multiple devices in the home. For example, an incoming caller's identification information may be sent from the gateway to laptop 206 via an 802.11 connection, to multiple Bluetooth phones in the home via Bluetooth link 602, to a set-top box 208 for display on a television 209, etc.

The gateway 202 would also allow devices to share resources with other devices in the home, even if the devices are normally incompatible. For example, many cellular phones include text messaging and SMS (Short Message Service) options that allow cell phone users to send short text messages to one another. These messages are often inputted to a phone using the cell phone's numeric keypad, with a T9 input mechanic that can require up to three button presses to enter each textual character.

The process may simply involve the user indicating, from either the phone 603 or the laptop 206, that the user wishes to send a cell phone 603 text message using another device in the home. For example, the user may enter a command into the phone 603, and the phone 603 may send a command to the gateway 202 indicating the desired function. The gateway 202, which may already have stored profile information identifying the various home devices and their capabilities, may respond with a listing of all devices in the home having a text keyboard. The user can choose one from the list, and the gateway 202 can initiate a connection with the selected device to request entry of a text message. The user can then type in the message at the device (e.g., the laptop 206), and the text message may be transmitted to the gateway 202, and out to the cell phone 603 for transmission as a text message to the mobile network 605.

Alternatively, the user can indicate, from the laptop 206, that he/she wishes to send a text message using the cell phone 603. The laptop 206 may request that the user type in the desired message, and then send the request with the message to the gateway 202. The gateway 202 may transmit a message to the cell phone 603, requesting that the cell phone 603 send the text message, and the phone 603 may process it and transmit it to the mobile network 605, as if it were typed in on the phone 603's keypad. As another alternative, the laptop 206 may use its existing Bluetooth connection (if it has one) to directly send the text message request to the phone 603, bypassing the gateway 202.

Figure 8:
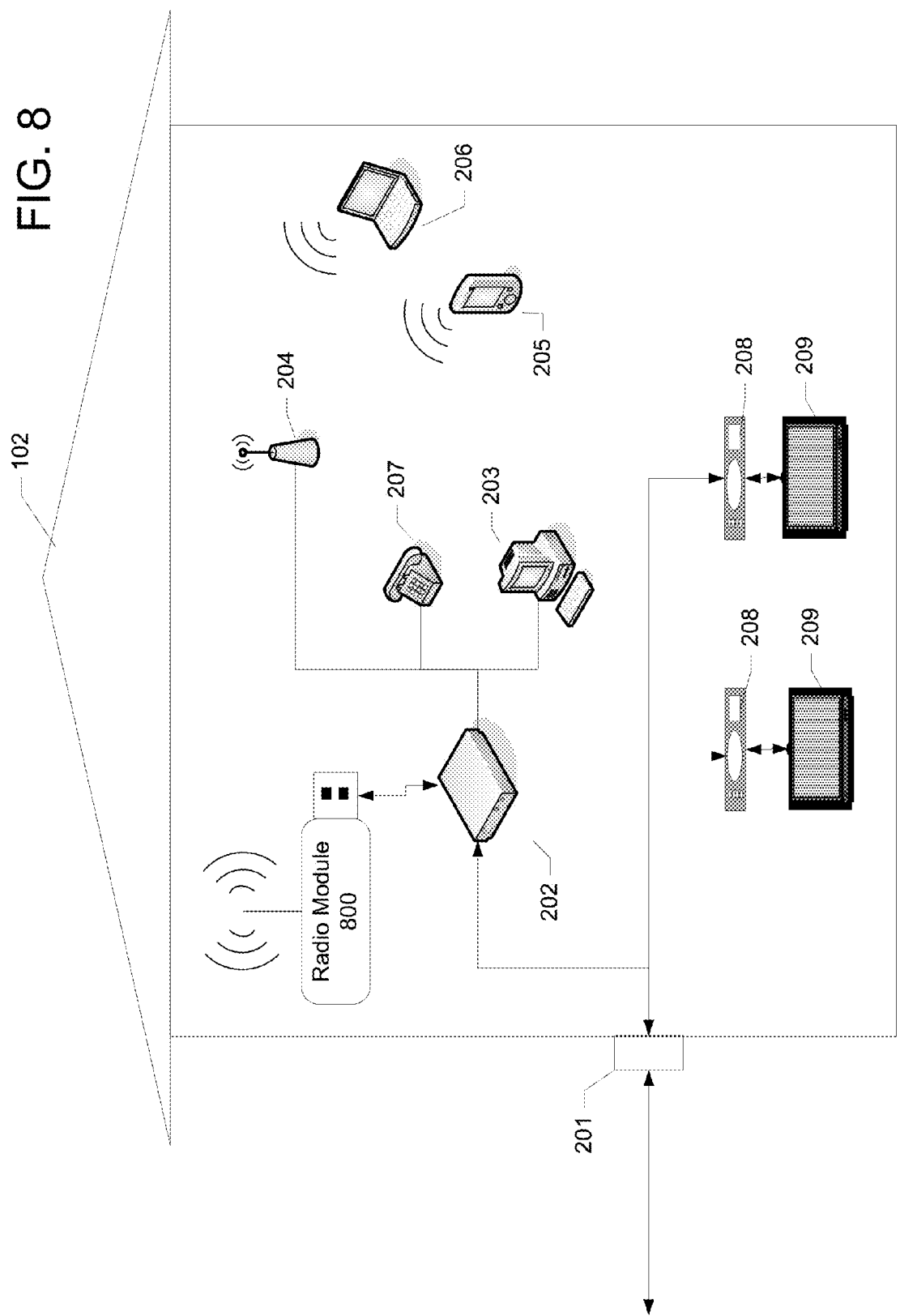
FIG. 8 illustrates an example configuration using a radio module.

FIG. 8 illustrates another example configuration of the home and expansion module. In FIG. 8, expansion module 800 may include transmission and/or reception circuitry to support other types of wireless communications. For example, the module can include an HD television receiver (ATSC), and can be tuned to receive HD television content and supply it to the gateway 202, which may then stream the content to other devices in the home that might not have an HDTV receiver (using whatever physical layer access capability they have, such as 802.11, MoCA, etc.). Similarly, the module can be used by the gateway 202 to transmit HDTV signals for content that may originally arrive through other means, such as a satellite feed, cable television program, Internet program, etc., thereby allowing a television with an HD receiver to receive content in those other formats (for which the HD television might not have a compatible receiver). Other types of radio content can include cellular phone network content, satellite television content, HD radio content, etc.

Figure 9:
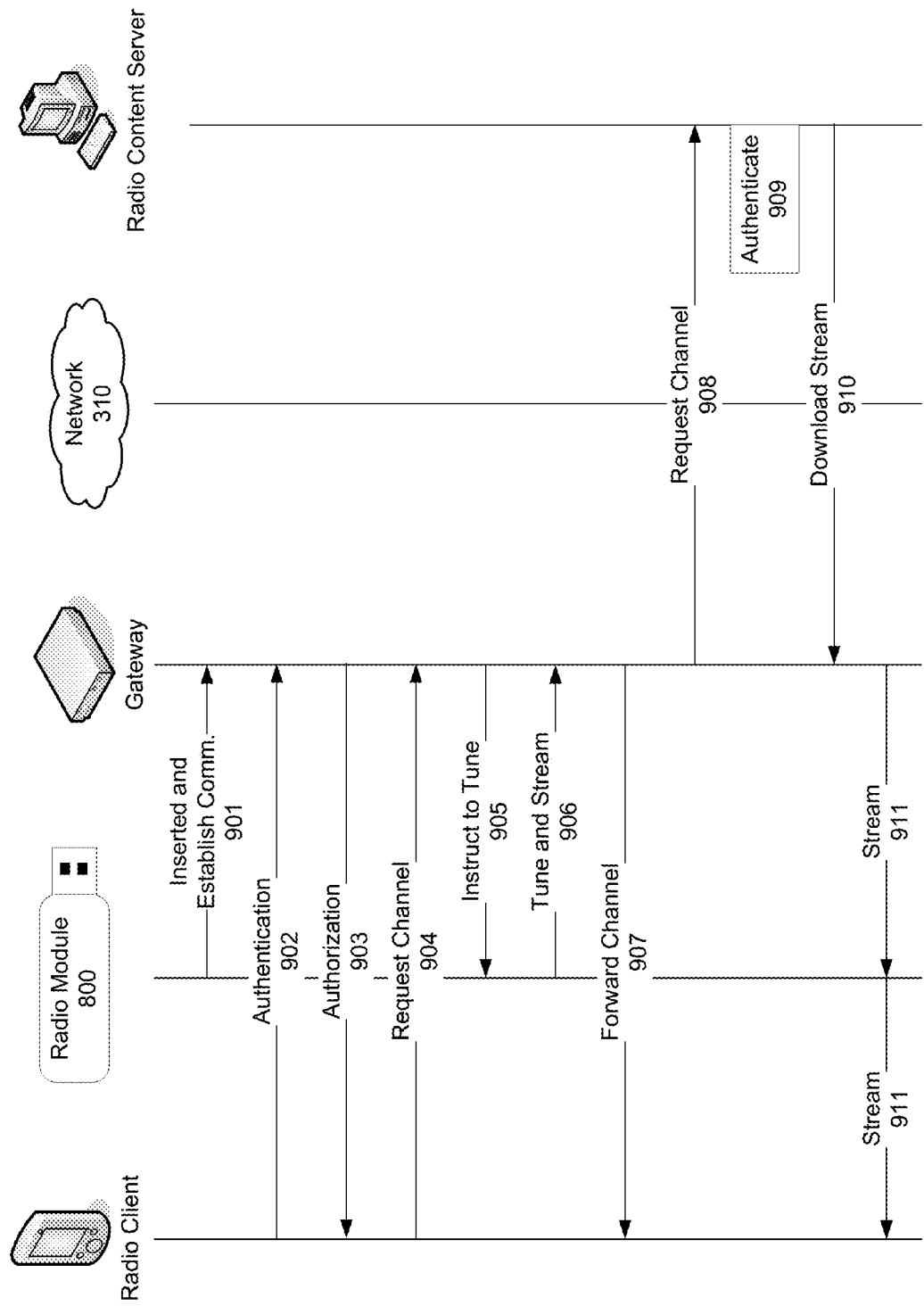
FIG. 9 illustrates an example signaling flow for a radio client.

FIG. 9 illustrates an example signaling flow for using such a radio expansion module to tune to content that is then supplied to the gateway 202. Initially, in step 901, the radio module 800 may be inserted into the gateway 202, and initial communications between the two can establish communication between them, and the gateway 202's control over the radio module 800's tuning resources. These resources may be used to supply a radio client (e.g., any processing device capable of receiving content for a user) with radio content for user consumption.

When a radio client enters the range of the gateway 202, the client may establish communications with the gateway 202 via the radio module 800, and authenticate itself to the gateway in step 902. This authentication may involve the radio client transmitting information identifying itself (e.g., a MAC address, subscriber identification, etc.) to the gateway 202, as well as additional information about the client, such as its audio characteristics and capabilities (e.g., number and type of speakers, available coding/decoding software and hardware, storage capacity, etc.). The actual communications may be made in any desired manner. For example, the audio device may use a wi-fi connection to communicate with the gateway 202. Alternatively, the device may use a wired connection (e.g., Ethernet) if it is a wired type of device.

The gateway 202 can then determine if the radio client is compatible with and permitted to be used with the gateway 202, and if the gateway 202 has available capacity to support the audio device. This capacity may be, for example, the number of tuners in the radio module 800. The radio module 800 may have a limited number of tuners, so if too many different channels are requested at the same time, the radio module 800 might not be able to service them all. Assuming the capacity is there, and that the audio device is otherwise acceptable and supportable, the gateway 202 can inform the device in step 903 that the authentication has passed.

Once the radio client is able to use the radio resources, the client may issue a request for a particular audio channel or service in step 904. The request may be transmitted to the gateway 202, which may then instruct the radio module 800 in step 905 to tune to the desired frequency carrying the desired channel. The radio module may tune to the desired frequency, and may prepare a data stream containing the requested channel, and forward that data stream to the gateway 202 in step 906. The gateway 202 may then forward that stream to the radio client in step 907, at which point the user can begin to listen to the requested channel. That stream may also be forwarded by the gateway 202 to other devices, such as other devices in the home (e.g., using a Bluetooth expansion module, a MoCA transmission, an 802.11 interface, etc.), or other devices outside the home (e.g., forwarding to a remote IP address, or allowing a user to remotely access tuned content received at his/her home).

The radio broadcaster may have just a single service/channel on a given frequency, in which case the module 800 itself may be configured to decode the received frequency and generate the resulting single stream for the requesting radio client. In that example, the gateway 202 may simply receive the stream from the radio module 800, and forward that stream (with little or no additional processing) on to the requesting radio client. In some alternative embodiments, a frequency might have multiple digital streams multiplexed together for transmission on that single frequency. In such embodiments, the module 800 can supply the entire multiplexed data stream to the gateway 202, allowing the gateway 202 to process and isolate the particular service/channel requested by the radio client. This may allow multiple devices to share a single radio tuner in module 800, although it places a greater processing burden on the gateway 202, which would be demultiplexing the streams to supply the requested ones to the requesting devices.

In the example embodiment above, the radio module 800 includes radio frequency tuning resources, and may generate a digital data stream for one or more requested services or channels. The gateway 202 may then deliver that stream to any radio client or device in the home, using whatever physical access technology the clients have available (e.g., 802.11, MoCA, Bluetooth, etc.). In an alternative example, the radio module 800 may simply be used to decode a data stream that is obtained through other means. For example, the module 800 may include decoding capability used to decode a protected content stream. In such an alternative example, the request for a channel 904 may be passed over the Internet to content server in step 908. The request may identify, for example, the requested channel or service, as well as the requesting radio client, the gateway 202, and/or the characteristics of the desired stream (e.g., coding type, number of channels, etc.), and in step 909 the content server may determine whether the request should be granted.

If the request is granted, then the content server may open a communication session and begin to download the requested stream to the gateway 202 in step 910. Then, in step 911, the gateway 202 may pass the stream to the radio module 800 for decoding (if desired), and the gateway 202 may then distribute the decoded stream to the requesting radio client for consumption. This stream may be accomplished using any desired streaming protocol. For example, DAAP (Digital Audio Access Protocol), Bonjour/ZeroConf, RTP (Real-time Transport Protocol), RTSP (Real-time Streaming Protocol) and/or RTCP (Real-time Transport Control Protocol) can be used to stream IP content. Alternatively, any media streaming protocol may be used (e.g., DLNA—Digital Living Network Alliance, Bonjour, etc.).

The actual content being delivered and streamed may be in any desired format. Uncompressed audio formats (e.g., Apple Lossless, WAV, AIFF, AU, etc.), native PCM (Pulse-Code Modulation) encoding, Lossless or Lossy WMA (Windows Media Audio), MP3, Vorbis, Musepack, ATRAC, AAC (Advanced Audio Coding), and/or MIDI (Musical Instrument Digital Interface) formats may all be used as desired.

So, for example, the radio expansion module 800 can provide HD radio content to other devices in the home. A USB based HD radio module would be connected to the gateway device 202, and the tuner in the radio would tune to multiple radio channels or would use the gateway backhaul connection for tuning to Internet radio channels. This radio would be able to tune to multiple channels simultaneously to support multiple clients requesting different programs/channels. The HD radio clients would connect to the gateway over an IP connection and could use any of the physical layer technologies such as an Ethernet, wireless or a MoCA connection. These clients would request for a specific channel or a program over a defined protocol interface with the gateway. The gateway would control the USB HD radio to tune to the specific channel(s) and multicast the content to the clients. In this way, the control and signaling path is through the gateway device and the media would be rendered directly from the HD radio to the clients. Thus, there would be no need to have separate HD radio tuners with each and every end device.

As noted above, the gateway could control the USB radio expansion module, and by proxy, any device communicating with the gateway could issue a command that would be relayed to the module to control it. Alternatively, the expansion module itself could be directly controlled by another remote control. The radio remote could communicate with the module over Ethernet, WiFi, MoCA, Zigbee, etc. The expansion module could contain its own circuitry to provide a separate interface for such a remote control (e.g., a separate Zigboo circuit to communicate with an expansion module remote control). As a further example, the remote control circuitry and separate interface could actually be a separate expansion module itself, "stacked" onto the radio module.

The above example uses the radio module 800 as a receiver or decoder. In alternative embodiments, the radio module 800 can be used as a transmitter. For example, any content available at the gateway 202 may be provided to a radio client, using the radio module 800's transmission capability to make the transmission. So, for example, if a client device only has an FM radio tuner, but wishes to listen to an HD radio broadcast, the gateway can support this with an FM radio transmission module. To do so, the user could instruct the gateway to tune to the HD radio broadcast using other means (e.g., either an HD radio module, or by downloading an Internet stream of an HD radio station), and then broadcast it locally using an FM radio expansion module.

Other use scenarios exist as well. For example, the gateway could be augmented to add digital video recorder (DVR) capabilities, allowing received content to be redirected anywhere via the gateway (e.g., local receiver, onto the Internet over IP, etc.). Coordination at the DVR allows multi-room functionality, such as watching at one location and resuming at another. Electronic Program Guide (EPG) functionalities can be added by expansion module as well.

The flow in FIG. 9 uses a single radio client as an example, but in implementation, the gateway 202 and radio expansion 800 may support multiple clients. For example, multiple audio devices can issue separate requests to the gateway 202, and the gateway 202 may use the radio module's resources to tune to some or all of the requested channels, and may also request Internet streams for some or all of the requested channels. When multiple clients request the same stream, the gateway 202 may generate a multicast stream to broadcast the requested stream to the devices in the home.

The radio module 800 may include sufficient processing and storage capability to manage the various radio clients in the home. In such an embodiment, the radio module itself would be responsible for tuning and/or demultiplexing received radio streams, maintaining records of user/client preferences, maintain a record of the channels that are received and available for streaming, create streams for individual clients in response to their requests, etc. If desired, the gateway 202 could simply be used as a transmission medium for the radio module 800.

In the discussion above, the radio module 800 is used to receive and tune to radio content, and provide that content to the gateway 202, and the gateway 202 is used to communicate with the radio clients. In alternate embodiments, the radio module 800 may also be used to communicate with the radio clients directly. For example, the radio module 800 can include wireless transmitters (e.g., IEEE 802.11, Bluetooth, AM/FM, Zigbee, Zwave, etc.), and can be configured to use them to transmit the streams to the radio clients over a wireless connection. In such embodiments, the radio module 800 can communicate directly with the clients to establish connections and process requests as discussed above, and the gateway 202 may simply be used as a power source, and as an Internet connection when a desired stream is available on an Internet radio server.

The discussion above uses an example in which the client requests the radio channel to be streamed. That is an example of a "pull" configuration. In alternative embodiments, content can be "pushed" to the clients by the gateway 202 and/or the radio module 800. For example, once radio clients establish successful communications with either of those devices, those devices may then determine that a particular radio stream should be automatically offered to the client, without the client having requested it. The gateway 202 or radio module 800 may transmit an unsolicited offer or inquiry to the radio client, seeking to deliver the stream being pushed.

In some embodiments, multiple clients within the home may request access to the same content having an audio portion. Since the different clients may each have different amounts of processing time for receiving and playing the content, it is possible that an echo may result (e.g., if one client plays its content 150 ms after the other client, then the two clients may appear to create an echo). To accommodate this difference, each client may include a buffer to synchronize audio content by adding delay to the faster client when two clients request the same content having audio portions. Doing so may involve checking to see if two clients have requested the same content, determining if the content has audio portions, determining if the clients are each playing that content out loud (e.g., not using headphones, or at a volume that is loud enough for one client to hear the other), and if so, then measuring the time lag between the two and buffering the faster client to synchronize it with the slower client.

In some embodiments, the radio client can be located outside the home, at a location that is remote from the gateway 202. In such embodiments, communications between the client and the gateway 202 and/or the radio module 800 can be conducted over a longer range network, such as the Internet. This would allow, for example, a user to take his/her laptop on a business trip, and remotely receive radio content received by the radio module 800 at the user's home.

User preferences (e.g., favorite stations, favorite programs, volume settings, etc.) may be maintained by the gateway 202 and/or the radio module 800, and may be used to customize the radio content being requested by, or delivered to, the radio clients. The preferences may be stored corresponding to the user and/or device identifiers provided, for example, in the authentication 902 step discussed above. The preferences can be used by the gateway 202 and/or the module 800 to modify the signaling discussed above, such as changing the streamed content or the request transmitted.

The user preferences may alternatively be stored at an application server on the Internet, outside of the home. In this manner, the user could have his/her customized experience even when roaming, for example, to a neighbor's home. In such an example, the authentication 902 may include a further check upstream with the application server to authenticate the user and to obtain the preferences for use by the neighbor's gateway 202 or radio module 800, to be used when servicing the roaming radio client's requests.

In the above examples, the gateway 202 can serve as a policy enforcer. For example, the gateway 202 could cause re-authentication after a predetermined time period (e.g., 1 minute, 5 minutes, etc.) of inactivity, automatic periodic re-authentication, re-authentication for each application use or service, etc.

The expansion modules can be used to add a wide variety of applications to the gateway 202 and its home. Some examples include adding video processing capacity, such as MPEG transcoding. Other examples may involve monitoring and/or controlling home security systems, heating/cooling systems, energy management and conservation, and any other desired added functionality. These various modules may have varying electrical power requirements, and the gateway 202 may be configured to automatically supply additional power to modules that need it. For example, a non-powered USB expansion port may be automatically converted to a powered USB expansion port by the gateway 202 adding power to the appropriate pins of the USB interface.

To help manage the modules, user profiles can be used to govern which modules can be used. For example, the gateway 202 may store profile information for each user of the household. The profile information may identify permission levels (e.g., a child might not have permission to change a thermostat setting), preferences (e.g., a phone application might store a caller's list of contacts), identification information (e.g., to identify users who purchase downloadable content), security credentials for accessing devices and applications (e.g., a user's public key, or trusted certificate), and any other desired personal profile information. Alternatively, the profiles may be stored at an external server (e.g., a "cloud-based profile"), and accessed by the gateway as needed.

Since the modules are readily inserted, removed and interchangeable, security may become an issue. The gateway 202 may take steps to monitor the modules, scanning them for security weaknesses. If a module is found to have a security weakness or issue (e.g., if the device has an invalid certificate, or if it is running a virus code), the gateway 202 can terminate communications with the module, or restrict the module's ability to communicate with other devices on the home or external network. The gateway 202 can also transmit a request to an application server, requesting a fix for the security situation (e.g., downloading a new software patch to remove viral code).

The ready interchangeability of the modules, and the ability to add more and more modules, also runs the risk of overloading the resources of the gateway 202. For example, if the gateway 202 has a limited amount of RAM to support running applications, then the gateway 202 may need to limit the number of applications that will be permitted to run. In some embodiments, the gateway 202 may prioritize applications. Some applications (e.g., telephone, home security, thermostat) may be given higher priority than others (e.g., video transcoding, video games, etc.).

One resource that can be overloaded is electrical power. If the home's power goes out, then the gateway 202 may include a limited amount of battery life, and in such situations the gateway 202 may limit the applications to just the higher priority applications. For example, a telephone application or home security application might take higher priority in the event of a home power failure.

The expansion modules herein may be USB expansion modules. In some embodiments, the gateway 202 may be configured to act as a relay between two connected USB expansion modules, allowing one USB module to act as a controller or master to the other. Two USB modules may also directly communicate with one another (e.g., via USB 3.0). For example, a Bluetooth expansion module may be stacked on an HD radio module, and the HD radio module can provide a digital datastream of HD radio content (received via the HD radio module's own tuning circuitry) directly to a Bluetooth module via the USB interface, and the Bluetooth module may send that stream out over a Bluetooth connection to a user's Bluetooth-enabled cell phone, thereby allowing the user's cell phone to listen to HD radio content without requiring its own HD radio receiver.

In the discussion above, various external servers (e.g., located outside the user's home, at a local headend, etc.) are described as having, in some embodiments, control over the determination of whether a new expansion module is actually to be supported at the gateway. FIG. 10 illustrates a logical example of how different levels of control in such a managed system can be implemented. In the FIG. 10 example, the lowest level is the physical connectivity or hardware layer control. This level may involve the physical connection with an expansion module, such as the USB port, the connector, and physically establishing communication with the module in the first place. That physical layer of control may be completely within the realm of the gateway, and may be limited to establishing basic communication with the expansion module.

The second layer of control may be the intelligent application layer for rudimentary access. In that layer, the gateway may conduct basic communications with the expansion module, and may permit the module to have rudimentary access to features/modules/functions/information on the gateway. For example, the gateway may be permitted to allow the module to identify the hardware components in the gateway, or learn details about the network to which the gateway is connected. The gateway may be restricted, however, from automatically granting permission to the module to freely use its network connection, or to offer the expansion module's full range of expansion services. Additionally, gateway applications may use IP addresses for communications between devices connected to the gateway 202, and may rely on the hardware/firmware layer to use those handles for communication. Doing so allows modification of an application without requiring updating the firmware. In some embodiments, a home gateway management application (HGMA) may be software residing on the gateway 202 to manage the update of applications.

The third level of control may be the network-based service control layer. At that level, the external server may be in control of determining whether a particular expansion module is permitted to work with a particular gateway to offer the full range of expansion module functionality. The external server may track the activation of modules, monitor their usage, and if trouble arises, take corrective action to deactivate, modify, or reboot modules and their respective gateways. In this manner, the external server may manage the gateway devices, and still allow those devices some flexibility to expand their functionality.

As another modification, a user's electronic program guide (EPG) may list content that is available from a wide variety of sources. For example, an EPG offered by a STB may list HD radio content received from an HD module, HDTV content from an HDTV module, content from a laptop 206 hard drive, content available via cell phone 603 and Bluetooth, content available from an external content server, etc. all together for the viewer's perusal and selection.

The various examples and embodiments described above are merely examples. The various steps and components may be combined, subdivided, rearranged and/or omitted as desired. This patent should not be limited by those examples, but rather, should be defined by the following claims.

We claim:

1. A method comprising:
    communicatively coupling, by a gateway, the gateway with a cell phone via a local wireless communication protocol;
    communicatively coupling, by the gateway, the gateway with one or more other computing devices;
    receiving, by the gateway, a request to allow one or more of the other computing devices to send a text message using the cell phone;
    receiving, by the gateway, a text message from a sending one of the other computing devices; and
    transmitting, by the gateway and to the cell phone, the text message with a request to have the cell phone send the text message over a mobile network connection of the cell phone.

2. The method of claim 1, wherein the request to allow one or more of the other computing devices to send a text message using the cell phone is received from the cell phone, and wherein the method further comprises:
    in response to receiving the request to allow one or more of the other computing devices to send a text message using the cell phone, determining, by the gateway, which ones of the other computing devices comprise a text keyboard;
    transmitting, to the cell phone, a listing of the other computing devices that comprise a text keyboard; and
    receiving, from the cell phone, a selection of one of the other computing devices, from the listing, for generating the text message.

3. The method of claim 1, further comprising allowing a user to generate the text message from a portable computer, and to transmit the text message to the cell phone, via the gateway, for transmission over the mobile network connection of the cell phone.

4. The method of claim 3, wherein the text message is transmitted to the cell phone via a Bluetooth connection.

5. The method of claim 1, further comprising accessing, by the gateway, a listing of local computing devices communicatively coupled to the gateway and having a text keyboard.

6. A method comprising:
    communicatively coupling a cellular telephone network module of a gateway with a cell phone, the cellular telephone network module comprising a wireless interface;
    storing, by the gateway, profile information identifying:
        at least one local device capable of requesting a phone call using the cell phone, and
        at least one local device capable of requesting a text message using the cell phone;
    receiving, by the gateway and from a sending local device, a request to use the cellular telephone network module to make a call or send a text; and
    attempting, by the gateway, to use the wireless interface to establish a phone call or send a text message over a mobile network connection of the cell phone.

7. The method of claim 6, wherein the attempting comprises attempting to establish the phone call, further comprising:
    detecting a call setup failure in response to the attempt to establish the phone call using the wireless interface; and
    in response to the call setup failure, using a wired interface of the gateway to make a second attempt at establishing the phone call.

8. The method of claim 7, wherein the wired interface of the gateway is a coaxial cable interface.

9. The method of claim 6, further comprising:
    communicatively coupling the gateway to a at least one computing device; and
    receiving a request to send the text message, generated by the at least one computing device, using the cell phone and the wireless interface.

10. The method of claim 6, further comprising:
    receiving, by the cell phone, from at least one computing device, and over a Bluetooth connection, the text message and a request to transmit the text message; and
    transmitting, by the cell phone and on behalf of the at least one computing device, the text message.

11. A gateway comprising:
one or more processors; and
memory, storing instructions that, when executed by the one or more processors, causes the gateway to perform the following:
communicatively coupling the gateway with a cell phone via a local wireless communication protocol;
communicatively coupling the gateway with one or more other computing devices;
receiving a request to allow one or more of the other computing devices to send a text message using the cell phone;
receiving a text message from a sending one of the other computing devices; and
transmitting, to the cell phone, the text message with a request to have the cell phone send the text message over a mobile network connection of the cell phone.

12. The gateway of claim 11, wherein the request to allow one or more of the other computing devices to send a text message using the cell phone is received from the cell phone, and wherein the memory further stores instructions that, when executed by the one or more processors, causes the gateway to perform the following:
in response to receiving the request to allow one or more of the other computing devices to send a text message using the cell phone, determining which ones of the other computing devices comprise a text keyboard;
transmitting, to the cell phone, a listing of the other computing devices that comprise a text keyboard; and
receiving, from the cell phone, a selection of one of the other computing devices, from the listing, for generating the text message.

13. The gateway of claim 11, wherein the memory further stores instructions that, when executed by the one or more processors, causes the gateway to perform the following:
authorizing a user to generate the text message from a portable computer; and
transmitting the text message to the cell phone, via the gateway, for transmission over the mobile network connection of the cell phone.

14. The gateway of claim 13, wherein the text message is transmitted to the cell phone via a Bluetooth connection.

15. The gateway of claim 11, wherein the memory further stores instructions that, when executed by the one or more processors, causes the gateway to perform the following:
accessing a listing of local computing devices communicatively coupled to the gateway and having a text keyboard.

* * * * *

UNITED STATES PATENT AND TRADEMARK OFFICE
CERTIFICATE OF CORRECTION

PATENT NO. : 9,830,144 B2  
APPLICATION NO. : 14/610406  
DATED : November 28, 2017  
INVENTOR(S) : Connelly et al.

Page 1 of 1

It is certified that error appears in the above-identified patent and that said Letters Patent is hereby corrected as shown below:

In the Specification

Column 3, Line 59:
After "network", please delete "101" and insert --100--.

In the Claims

Claim 9, Column 18, Line 57:
After "to", delete "a".

Signed and Sealed this
Twenty-first Day of August, 2018

Andrei Iancu
*Director of the United States Patent and Trademark Office*